J. VERMEHREN.
MACHINE FOR THE EFFECTING OF MULTIPLICATIONS.
APPLICATION FILED JULY 1, 1912.

Patented Apr. 6, 1915.

UNITED STATES PATENT OFFICE.

JOHANNES VERMEHREN, OF HELLERUP, NEAR COPENHAGEN, DENMARK, ASSIGNOR TO AKTIESELSKABET VERMEHRENS REGNEMASKINER, OF HELLERUP, NEAR COPENHAGEN, DENMARK.

MACHINE FOR THE EFFECTING OF MULTIPLICATIONS.

1,134,169.      Specification of Letters Patent.      Patented Apr. 6, 1915.

Application filed July 1, 1912. Serial No. 707,088.

*To all whom it may concern:*

Be it known that I, JOHANNES VERMEHREN, director, subject of the Kingdom of Denmark, residing at No. 9 Johannevej, Hellerup, near Copenhagen, in the Kingdom of Denmark, have invented new and useful Improvements in Machines for the Effecting of Multiplications, of which the following is a specification.

The present invention relates to calculating apparatus and particularly to a multiplying machine for effecting the multiplication of two numbers having several figures, by which machine the multiplication of the multiplicand by the single figures of the multiplier is effected by setting the individual figures of the multiplier after the multiplicand has been set.

Apparatus has been previously proposed wherein the multiplication of the multiplicand is effected by a multiplier consisting of a single digit.

The invention consists essentially in that the individual figures of the multiplicand are set in each of a number of groups or principal parts, which are stepped sideways to the extent of one unit in relation to each other, and a number of individual teeth corresponding with the product of the multiplicand and the individual figures of the multiplier are formed into rows in the individual groups by setting the individual figures of the multiplier in just the same manner as when the multiplication is effected on paper, and the numbers of teeth in each row are added up by means of a counting mechanism, which is moved relatively to the teeth or vice-versa in order to obtain the final product. Furthermore, it is of a great importance that all transferring of the tens should be effected after the completing of the addition of the individual products, whereas the individual multiplying elements move a number of bars in such a manner that the bars corresponding with the units of the one element are interdigitated between the bars corresponding with the tens of the next following element.

In order to explain the forming into rows of the individual teeth by means of the multiplying elements, the following example is given in which example the figures indicated correspond with the number of teeth employed.

The numbers 4891 and 208 are to be multiplied.

| | |
|---|---|
| The product of 4891 by 8 | 08 |
| | 72. |
| | 64.. |
| | 32... |
| The product of 4891 by 0 | 00. |
| | 00.. |
| | 00... |
| | 00.... |
| The product of 4891 by 2 | 02.. |
| | 18... |
| | 16.... |
| | 08..... |
| Final product | 1017328. |

The preceding example shows that the individual products are placed together in conformity with the manner of writing the arithmetical problem on paper, except that the direct transferring of the tens has not been effected within the products. The real transferring of the tens is effected at the completion of the addition of all the products and is preferably effected by moving a number of teeth, corresponding with the tens to be transferred during the addition, into the next following higher row of teeth substantially in the same manner as in the multiplying elements.

One form of the invention is illustrated in the accompanying drawings, wherein—

Figures 1ª and 1ᵇ are sectional views of a machine taken on the line X—Y in Figs. 2ª and 2ᵇ parts being omitted for the sake of clearness; Figs. 2ª and 2ᵇ are sectional views on the line U—V of Figs. 1ª and 1ᵇ; Figs. 3ª and 3ᵇ are sectional views on the lines Z—W of Figs. 1ª and 1ᵇ.

Figure 1:
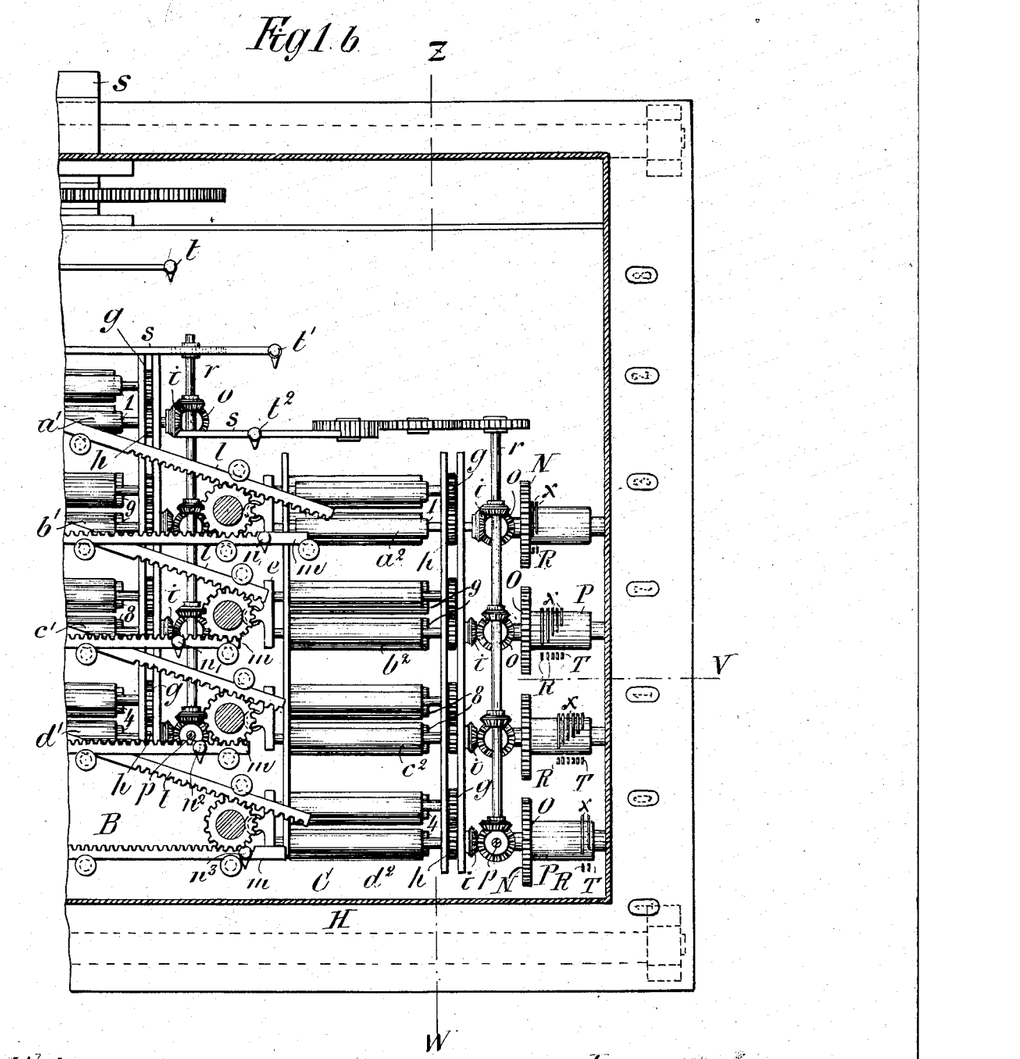
Figure 1A:
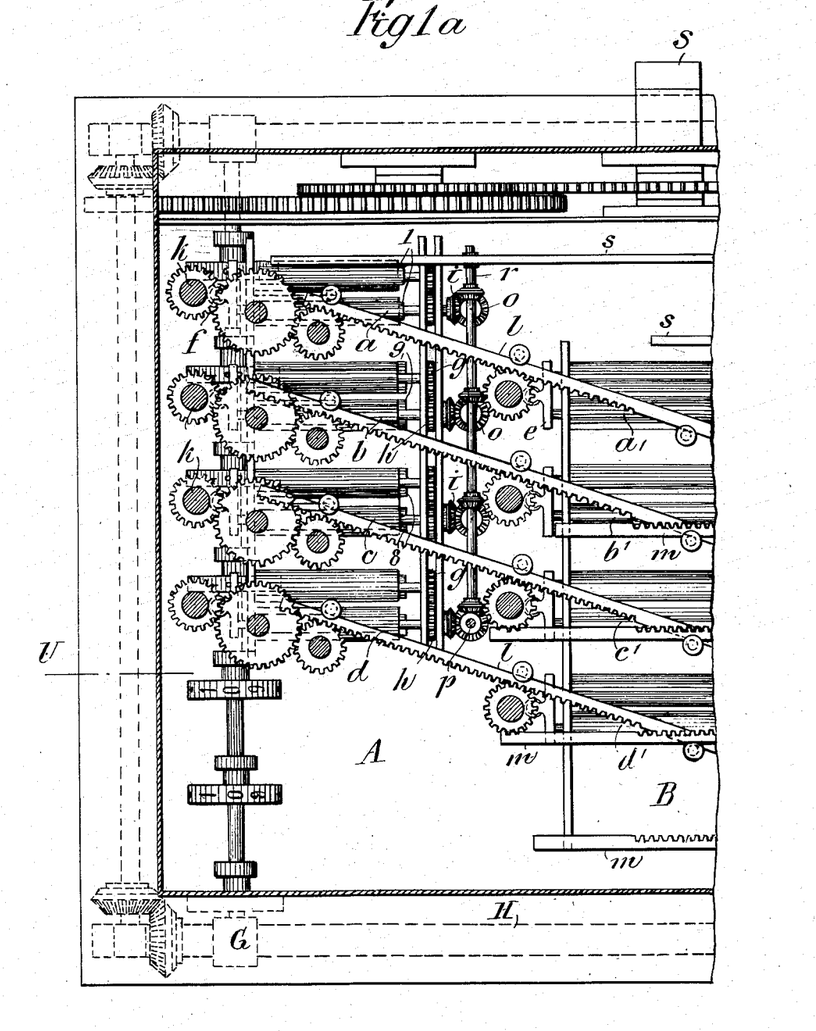

In the form of the invention illustrated which is adapted for the multiplication, at the most, of a number having four figures by a number having three figures, the machine consists of three principal parts or groups, A, B, and C, Figs. 1ª and 1ᵇ, which are identical but, as above set forth, stepped in such a way in relation to each other that the group A represents the product of the multiplicand and the unit digit of the multiplier, the group B the product of the multiplicand and the tens digit of the multiplier, and so on, just as in the disposition of the figures of the arithmetical problem on paper.

Each group consists of four elements $a$, $b$, $c$ and $d$, $a'$, $b'$, $c'$, $d'$ and $a^2$, $b^2$, $c^2$, $d^2$, which are also identical and of which everyone corresponds with one of the figures of the multiplicand, so that the element $a$, $a'$, $a^2$ corresponds with the units, the element $b$, $b'$, $b^2$ with the tens, and so on.

Figures 3, 4:
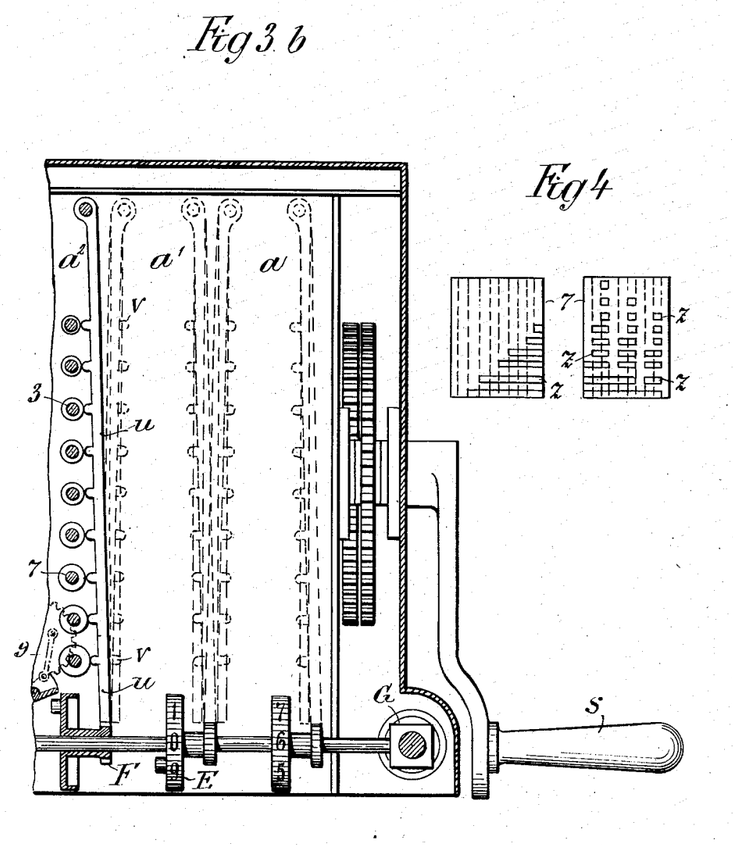
Fig. 4 is a detail view.
Figure 3A:
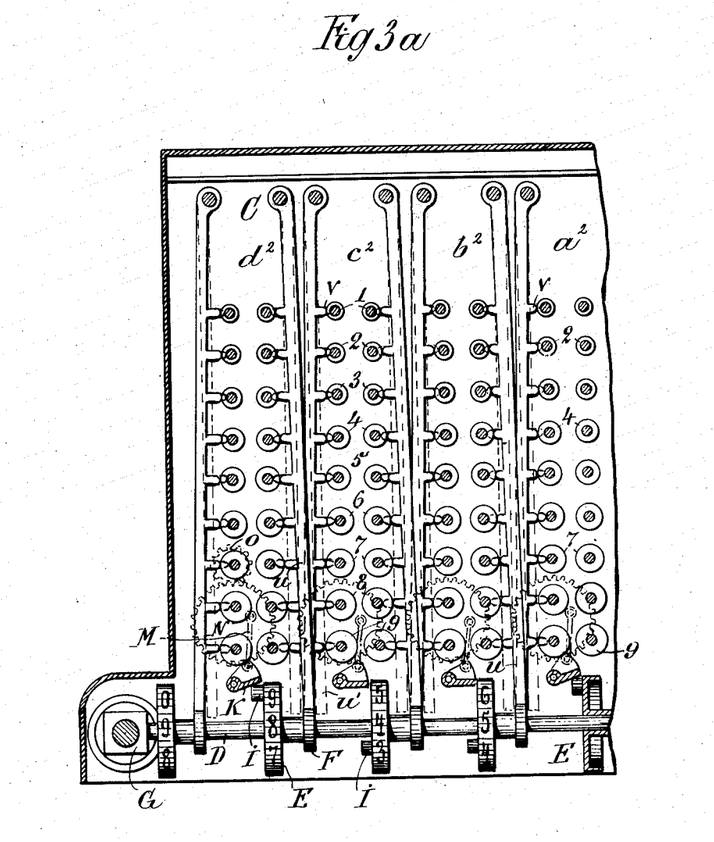

Each element is composed of nine superposed pairs of horizontal cylinders 1, 2, 3, 4, 5, 6, 7, 8 and 9, Fig. 3ª, of which every pair corresponds with one of the digits from "1" to "9," and each cylinder has on its surface different projections or cams $z$. In Fig. 4 the pair of cylinders 7 is shown in developed state. The surface of each cylinder is divided into ten equal longitudinal zones denoted by dotted lines, across which zones one or more of the cams $z$ extend. The number of cams extending across each zone on each cylinder of the pair is so determined that the cams on the one cylinder represent the units and on the other cylinder the tens of all the products of the figure represented by the pair of cylinders that is, in this case, the figure 7, and the digits from "0" to "9." Therefore in the case shown it is evident that the right hand cylinder has ten cam zones having respectively 0, 7, 4, 1, 8, 5, 2, 9, 6 and 3 cams or projections, while the other, the left-hand cylinder has ten cam zones across which extend respectively, 0, 0, 1, 2, 3, 4, 5 and 6 cams, and in this manner the cams on the two cylinders represent all the products of the number "7" and the numbers 0–9, viz. 00, 07, 14, 21, 28, 35, 42, 49, 56 and 63.

Figure 2A:
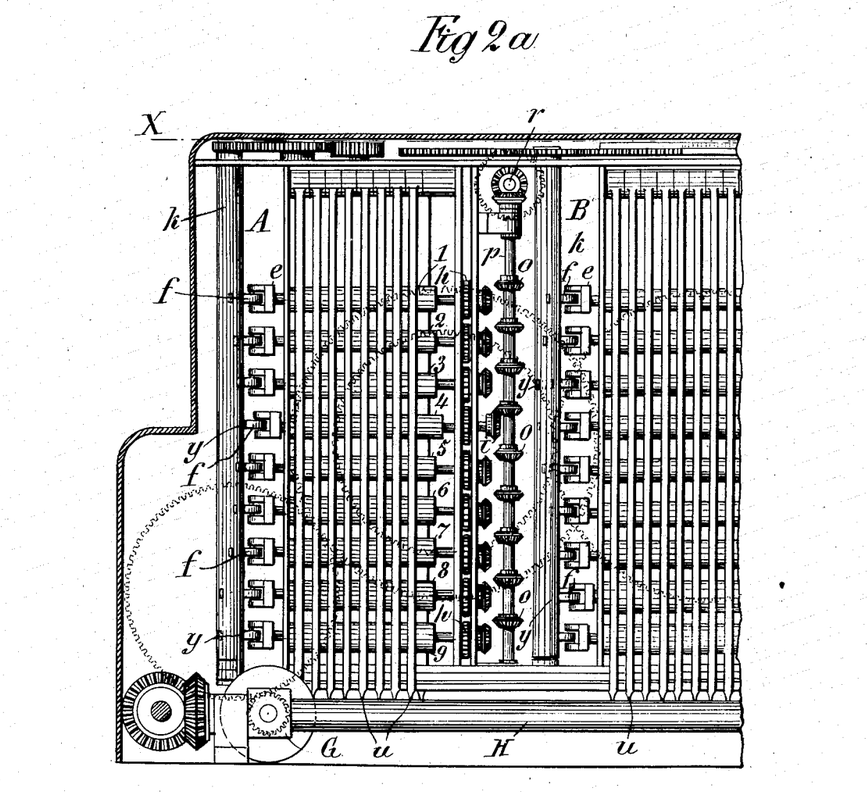
Figure 2B:
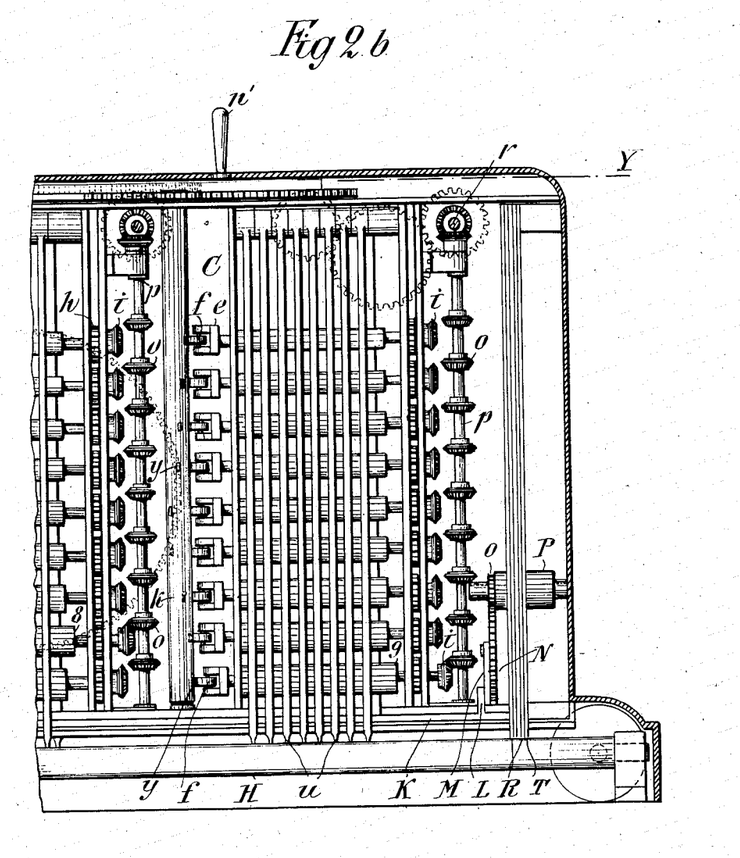

The cylinders are mounted each on a shaft and the shafts of each pair are mounted at one end in a cross-piece $e$ Figs. 2ª and 2ᵇ carrying a roller $f$ which bears against a cylinder $k$ vertically disposed in the machine. The cylinder $k$ is revolved on its axis through a gear-connection by a horizontal rack $l$ Figs 1ª and 1ᵇ which is inclined to the longitudinal axis of the apparatus and the rack $l$ meshes with a gear-wheel which also meshes with a rack $m$ having an operating knob $n$, $n'$, $n^2$, $n^3$, and in this manner the rack $l$ may be moved to and fro. The cylinder $k$ has nine cams or projections $y$, Figs. 2ª and 2ᵇ, arranged helically on the cylindrical surface thereof and equally spaced angularly with the exception of the first and the last projection between which the distance is twice as great as between the other projections, each of the projections $y$ being placed opposite a corresponding roller $f$. In this manner the cylinder $k$ is divided into ten zones longitudinal thereof, in each of which zones is a projection $y$ opposite a roller $f$ except one zone forming a zero line on which there is no projection. At a distance of one-tenth of the circular periphery of the cylinder $k$ from the zero line there is a projection $y$ opposite the roller $f$ of the pair of cylinders 1; at a distance of two-tenths of said circular periphery from the zero-line and opposite the roller $f$ of the pair of cylinders 2 is placed another projection $y$, and so on. Each pair of cylinders is spring-pressed (by a spring, not shown) so that the roller $f$ normally bears against the cylinder $k$.

The cylinder shafts of each pair of cylinders are provided, at the ends opposite the cross-piece $e$, with intermeshing gear-wheels $g$ and $h$ Figs. 1ª and 1ᵇ respectively, and furthermore, one of the shafts of each pair is provided with a bevel wheel $i$, Figs. 1ª, 1ᵇ and 2ª and 2ᵇ. When a pair of cylinders is pushed to the right, see for instance in Figs. 2ª and 2ᵇ the cylinders 4, 8 and 9 by its corresponding projection $y$, when the cylinder $k$ is revolved, the bevel-wheel $i$ of the pair of cylinders meshes with a corresponding bevel-wheel $o$ mounted on a vertical shaft $p$, which in turn is adapted to be revolved by a horizontal shaft $r$ through bevel gearing. The shaft $r$ is itself to be revolved by means of a rack $s$ which is provided with an operating knob $t$ ($t'$, $t^2$).

At each side of each element $a$, $a'$, $a^2$, $b$, $b'$, $b^2$, $c$, $c'$, $c^2$ and $d$, $d'$, $d^2$ a series of upright bars $u$ Figs. 2ª and 2ᵇ is arranged, said bars being pivotally secured at their upper ends to the frame of the machine and each provided at its lower end with a tooth. The bars $u$ have projections $v$ Figs. 3ª and 3ᵇ directed toward the cylinders, each projection being opposite a pair of cylinders.

At the side of that series of cylinders in each element representing the units, nine bars $u$ are arranged, and at the side of that series representing the tens eight bars $u$ are arranged in such a way that the left-hand bars of one element may be interdigitated between the right-hand bars of the next following element, Figs. 3ª and 3ᵇ, so that the adjacent bars of two adjacent elements may be interdigitated to form a row of teeth comprising at the most seventeen teeth, the bars $u$ in Figs. 3ª and 3ᵇ being shown in their interdigitated positions, one bar to the left being also shown in dotted lines in its normal inner position $u^1$.

Assuming all the parts of the apparatus to be in their normal or zero positions, the multiplicand and the multiplier are set in the following manner: Suppose that 4891 is to be multiplied by 208, as indicated in the preamble, the "unit" knob n for the multiplicand is moved opposite the figure "1" on an adjacent scale (not shown), the "tens" knob n' is then moved to "9," and so on, the different positions of the knobs being shown in Figs. 1ᵃ and 1ᵇ. The movement of the "unit" knob n from "0" to "1" causes the cylinders k corresponding with the elements $a, a', a^2$ to be revolved one tenth of a revolution from the zero-line, so that the pair of cylinders 1 is moved by its corresponding projection y, as above set forth, and its bevel-wheel i is brought into engagement with the corresponding bevel-wheel o. In the same manner the pair of cylinders 9 in the elements $b, b', b^2$, the pair of cylinders 8 in the elements $c, c', c^2$ and the pair of cylinders 4 in the elements $d, d', d^2$ are moved and their respective bevel-wheels i are brought into engagement with the corresponding bevel-wheels o. The "unit" knob t for the multiplier is then moved opposite the figure "8" on its scale, while the "tens" knob t' is left opposite "0," and the "hundreds" knob $t^2$ is moved opposite the figure "2," the different positions of the said knobs and the corresponding parts of the machine being shown in Figs. 1ᵃ and 1ᵇ. The movement of the "unit" knob t from "0" to "8," causes the shaft r in the group A, and consequently all the shafts p in said group, to be revolved eight-tenths of a revolution. All the pairs of cylinders—viz. the cylinders 1, 9, 8, 4—in the elements of the group A, moved as show set forth, are consequently revolved eight-tenths of a revolution, with the result that in each of said pairs of cylinders a number of cams is brought into operative position, said number representing the product of the figure "8" multiplied by the figure corresponding with the pair of cylinders. Those cams which have been brought into operative position bear against the projections y of the bars u opposite said cylinders. Thus in the element n of the group A the right-hand cylinder of the pair of cylinders 1 acts on eight bars u but the left-hand cylinder does not act on any bars u, this adjustment corresponding with the first partial product 08; in the element b of the said group the right-hand cylinder of the pair of cylinders 9 acts on two bars u and the left-hand cylinder acts on seven bars u, thus corresponding with the second partial product 72; in the element c the right-hand cylinder of the pair of cylinders 8 acts on four bars u and the left-hand cylinder acts on six bars u, thus corresponding with the third partial product 64; and in the element d the right-hand cylinder of the pair of cylinders 4 acts on two bars u and the left-hand cylinder acts on three bars u, thus corresponding with the fourth partial product 32. As a result of this action on the bars u and the consequent interdigitation, five rows of teeth having respectively 8, 2, 11, 8 and 3 teeth are formed in the group A.

In the group B no pairs of cylinders are moved longitudinally and consequently none are revolved because the figure in the "tens" place of the multiplier is zero and thus no bars u are acted on in said group, and in the group C four rows of teeth having respectively 2, 8, 7 and 9 teeth are formed. As the groups are stepped sideways to the extent of one element it follows that of the rows of teeth formed in the group C, the three first-named rows constitute continuations of the three rows of teeth in the group A, which have respectively 11, 8 and 3 teeth, so that said three rows have a total of 13, 16 and 10 teeth. It is obvious, therefore, that if a series of number-wheels having pinions or toothed wheels corresponding with the teeth on the bars u be moved under the formed rows of teeth, it will be possible to add up the products of the multiplicand multiplied by the individual figures of the multiplier, which products are relatively stepped in the three groups in just the same manner as when the multiplication is effected on paper, the transferring of tens necessitated by the addition being the only further operation to be effected as the other transferring of tens has already been effected virtually owing to the stepped arrangement of the elements.

In the present form of the calculating machine the said addition is effected in the following manner: At one end of the machine a shaft D is mounted, said shaft carrying a series of number-wheels E on each of which are marked the figures "0" to "9" and which are free to turn on said shaft D but are not longitudinally displaceable thereon. Each wheel E is secured to a pinion F, Figs. 3ᵃ and 3ᵇ, which is pawl-controlled to prevent the pinion from being revolved unintentionally.

The shaft D carries at each end a nut G Figs. 2ᵃ and 2ᵇ each engaging with a screw-threaded shaft H and the shafts H are adapted to be revolved through suitable gearing in such a manner that a single revolution of a crank-handle S, Fig. 3ᵇ, moves the shaft D from one end of the machine to the other. The pinions F are consequently moved under and in mesh with the rows of teeth formed as hereinbefore set forth, which rows of teeth constitute interrupted racks, and the number-wheels E are consequently revolved to an extent proportional with the number of teeth in its row and thus effect the addition.

As in the present embodiment of the invention, the maximum number of teeth which can constitute a row of teeth is 51, viz. 9+8=17 interdigitated teeth in each of the three groups, it is impossible that more than five transferrings of tens may have to take place. Said transferrings may be effected in a well-known manner by means of a tens-transferring mechanism connected with the number-wheels, but in the machine illustrated said transferring of tens is effected by means of a special mechanism which is prepared during the addition for the transferring which is effected subsequently. For this special transfer mechanism each number-wheel E, with the exception of those farthest to the right and to the left, has a projection I (Figs. 3ᵃ and 3ᵇ) which, every time the wheel has made a whole revolution from "0" to "9," engages a fouling-bar K. The fouling-bar K extends under all those elements lying in the same longitudinal plane of the machine as shown in Figs. 2ᵃ and 2ᵇ and may be turned about one of its edges. The bar K is provided with an arm L, Figs. 2ᵇ and 3ᵃ and 3ᵇ, which is pivoted to a link M eccentrically secured to a spur-wheel N. The wheel N meshes with another spur-wheel O, the shaft of which carries a cylinder P, Figs. 1ᵇ and 2ᵇ, which is so connected with the wheel O by pawl and ratchet mechanism that the cylinder is revolved by said wheel O in one direction only, namely when the wheel O is revolved by the engagement of the projection I with the bar K. The cylinder P is provided on its cylindrical surface with cams $x$, shown diagrammatically in Fig. 1ᵇ, extending partially around the cylinder and of such a length that one cam is brought into operation at the first complete revolution of the wheel E and acts on one of a series of bars R at the left side of the cylinder, shown diagrammatically in Fig. 3. At the next complete revolution of the wheel E the next cam $z$ becomes operative so that two bars R are acted on and pressed out of their normal position, and so on. The bar K is spring-pressed so that it returns to the horizontal position as soon as the projection I has disengaged therefrom.

The bars R are similar in shape to the bars $u$ and, like said bars, are each provided at the lower end with a tooth. It is obvious that the bars R must be set in the same row as the bars $u$ corresponding with the tens of each element so that the tens are always transferred to the next number-wheel to the left.

As more than five transferrings of tens are not required, only five bars R are necessary for the totalizing, while the wheels F are engaging the teeth of the bars $u$, but a further transferring can take place when the wheels F in engaging the teeth on the bars R, are so revolved that the projections I engage the fouling-bars K which extend under the cylinders P. As only five bars R can be set as hereinbefore set forth, the projections I cannot engage their respective fouling bars K more than once while the wheels F mesh with the teeth on said bars R; consequently only one additional bar is required. Therefore a sixth bar T is arranged, Figs. 1ᵇ and 2ᵇ, which may be operated by means of a cam $x$ on the cylinder P in the same manner as the bars R. Furthermore, it is possible that such an additional transferring of tens may take place simultaneously in two or more mechanisms and in order to transfer the tens correctly, the bars T are stepped in relation to each other so that each bar T is at an increased distance from the bars R, the further the particular mechanism is removed from the first tens-transferring mechanism, as diagrammatically represented in Fig. 1ᵇ, in which also the bars R are shown as stepped in relation to the bars R of the adjacent cylinders. The transferring of tens is thus effected without the aid of star-wheels or the like in the counting mechanism itself, which consists only of a series of number-wheels with corresponding pinions.

In order that the bars $u$, R, T once set may be prevented from being displaced during the addition, each bar may be spring-pressed and be moved by its respective cam against a stop.

When the calculation is accomplished by means of a single revolution of the crank-handle S, the result is shown through convenient openings in the cover-plate, as indicated with dotted figures in Fig. 1ᵇ, (viz. 1017328), and the counting apparatus may be returned to its initial position. The number-wheels E will thus be revolved back to "0" and the cylinders P will at the same time be revolved (by suitable mechanism, not shown, for instance, means for reversing the pawls and consequently the direction of rotation of said cylinders P through the engagement of the projections I with the respective fouling-bars) so that those bars R and T, which were set will reassume their normal position.

The different parts of the mechanism may of course be otherwise arranged and actuated, for instance the groups of the machine may be carried around the surface of a cylinder which by a single revolution is made to engage by the counting-mechanism, or in the form represented and described the mechanism for the setting of the factors may be made movable in relation to, and moved either over or under, the number-wheels.

Having now particularly described and ascertained the nature of the said invention and in what manner the same is to be performed, I declare that what I claim is:

1. In a multiplying machine, in combination, a plurality of groups of elements corresponding to the digits of the multiplicand, said groups being stepped with respect to one another so that the unit element of any group will be in alinement with the unit element of the next preceding group, each of said elements comprising members corresponding to the digits 1 to 9 inclusive, means for setting corresponding elements of all of said groups proportionately to the digits of the multiplicand, means for rotating the thus set elements proportionately to the digits of the multiplier, counter mechanism operating devices adapted to be actuated by said rotated elements and counting mechanism adapted to be operated by said counter mechanism operating devices.

2. In a multiplying machine, in combination, a plurality of groups of elements corresponding to the digits of the multiplicand, said groups being stepped with respect to one another so that the unit element of any group will be in alinement with the tens element of the next preceding group, each of said elements comprising nine pairs of rotatable members corresponding to the digits 1 to 9 inclusive, the members of each pair being provided with a plurality of actuating devices corresponding to the unit digits and tens digits of products obtained by multiplying the digit represented by said pair of members by the digits from 0 to 9 inclusive, actuating means normally out of operative relation with said rotatable members for rotating the same, means for moving corresponding pairs of elements of all of said groups into operative relation with said actuating means, means for rotating said corresponding pairs of elements proportionately to the digits of the multiplier, counter mechanism operating means adapted to be set by said actuating devices, and counting mechanism adapted to be operated by said operating means.

In testimony whereof I have signed my name to this specification in the presence of two subscribing witnesses.

JOHANNES VERMEHREN.

Witnesses:
MARCUS MOELLER,
O. LARSEN.